United States Patent [19]

Gaunt

[11] 4,345,668
[45] Aug. 24, 1982

[54] VERY LOW FLOW RATE LUBRICANT METERING APPARATUS AND METHOD FOR A TOOL AND WORKPIECE

[76] Inventor: Frank L. Gaunt, 6922 - 113th Court St. East, Puyallup, Wash. 98371

[21] Appl. No.: 166,404

[22] Filed: Jul. 7, 1980

[51] Int. Cl.³ ............................................. F16N 13/16
[52] U.S. Cl. ......................................... 184/29; 91/46; 184/7 E; 408/59
[58] Field of Search ............... 408/56, 57, 59; 184/29, 184/56 A, 7 D, 7 E; 91/46

[56] References Cited

U.S. PATENT DOCUMENTS

| | | | |
|---|---|---|---|
| Re. 26,975 | 10/1970 | Borman et al. | 408/59 |
| 2,204,119 | 6/1940 | Campbell | 184/29 |
| 2,719,603 | 10/1955 | Le Clair | 184/7 R X |
| 3,130,818 | 4/1964 | Smith et al. | 184/29 |
| 3,487,892 | 1/1970 | Kiefer | 184/7 E X |
| 3,547,350 | 12/1970 | Marcoux | 239/308 |
| 3,604,534 | 9/1971 | Whitaker | 91/46 X |
| 3,693,757 | 9/1972 | Callahan et al. | 184/29 X |
| 3,926,279 | 12/1975 | Thrasher | 184/29 |
| 4,105,095 | 8/1978 | Thrasher | 184/29 X |

Primary Examiner—David H. Brown
Attorney, Agent, or Firm—Gregory W. Moravan; Roy E. Mattern, Jr.; David H. Deits

[57] ABSTRACT

A precision, very low flow rate, lubricant metering apparatus and method for metering lubricant to a tool and workpiece while various machining operations are performed by the tool on the workpiece. The apparatus has a pneumatic air logic unit which delivers a stream of air pulses to a pneumatically driven positive displacement, precision lubricant injector pump at a selectively variable rate. In response to each air pulse delivered to it, the injector pump delivers a selectively variable amount of lubricant to a lubricant delivery line by which the lubricant can be conveyed to the tool and workpiece. When the apparatus is used with a machine tool powered by an air driven motor, an air flow sensing valve is provided which automatically delivers compressed air to the air logic unit only when the air driven motor is consuming compressed air. Since in many uses of the apparatus both lubricant and compressed air are needed at the tool and workpiece, special housings are provided which enable the delivery of lubricant from the injector pump to a line located within a compressed air delivery line. Air flow control valves may be provided which regulate the delivery of compressed air to the air logic unit and the compressed air delivery line.

20 Claims, 9 Drawing Figures

VERY LOW FLOW RATE LUBRICANT METERING APPARATUS AND METHOD FOR A TOOL AND WORKPIECE

BACKGROUND OF THE INVENTION

The present invention relates to lubricating devices and methods; and more particularly to a lubricating apparatus and method for metering out very low flow rates of lubricant to a tool and workpiece during various machining operations on the workpiece, such as, by way of non-limiting example, when the workpiece is drilled, reamed, tapped, turned, bored, routed, and milled.

SUMMARY OF THE INVENTION

As is known, during any of the machining operations mentioned above, while the tool is applied to the workpiece large amounts of heat are generated by the friction therebetween. This heat is highly undesireable as it leads to the early dulling or failure of the tool, or may render the tool inoperable in other ways, as by welding to it chips of metal formed during the machining operations on the workpiece.

To solve these problems, it is known to prolong the life of the tool by lubricating the contact area between the tool and the workpiece, and/or by cooling the tool and workpiece. Conventional machining lubricants, which are supplied to the tool and the workpiece at a rate which may be several gallons per minute, both lubricate and cool; but require special recovery and recirculating apparatus. Alternatively, special cooling techniques may be used to cool the tool and workpiece, such as by applying thereto fluorocarbons or other liquids at a rate which may be several gallons per hour. The fluorocarbons or other liquids cool the tool and workpiece primarily by their being evaporated during the machining operations. However, fluorocarbons are expensive, and their release into the atmosphere after they are evaporated is presently environmentally unacceptable.

The inventor has learned that the problem of preventing excessive heat buildup between the tool and workpiece during machining operations can be solved without the conventional use of large flow rates of lubricant; and without the use of conventional special cooling techniques. The inventor has discovered that certain lubricants are so effective that, when they are applied to the tool and workpiece during machining operations, very low flow rates of these certain lubricants prevent friction between the tool and the workpiece to such a degree that special cooling systems are not needed to cool the workpiece and tool, and that flooding the workpiece and tool with lubricants to carry away the heat generated during the machining operations is not necessary; despite the fact that "common sense" might indicate that if friction between the tool and workpiece were reduced to such degree, substantial cutting action between the tool and the workpiece should not occur. The inventor has discovered that, to the contrary, despite the application of these certain lubricants at very low flow rates, the cutting action between the tool and the workpiece are not reduced to a substantial degree.

One lubricant suitable for the inventor's purposes is Boelube brand lubricant which is composed of a high carbon (long carbon chain) fatty alcohol manufactured by the Orelube Corporation located in Plain View, N.Y. Another lubricant which may be suitable is a cetyl alcohol lubricant manufactured by the Ashland Chemical Company of Columbus, Ohio. under the name of Adol 520. Still another suitable lubricant may be Spermaceti. However, since said cetyl alcohol lubricant and Spermaceti are solids at room temperature, they would, of course, have to be heated to a temperature above their respective melting points in order to permit their convenient precision metering and application to the tool and workpiece, which is preferably done in their liquid states.

By way of example, during typical machining operations such as those mentioned above, the inventor has discovered that a flow rate, of the Boelube lubricant mentioned above, of less than 0.8 cubic centimeters per minute gives very satisfactory results. However, the use of such very low flow rates does present several problems. For example, it will be appreciated that if the flow rate of these highly effective lubricants is higher than is required for effective machining operations, costly wastage will occur, since Boelube, for example, presently costs about $75.00 per gallon. On the other hand, if the flow rate is too low, loss of the tool and possibly of the workpiece may result. Accordingly, extremely precise metering of these very low flow rates of lubricant is imperative.

In addition, since the precise amount of these highly effective lubricants which are needed will vary according to the particular machining operations being performed, the size of the tool, the hardness and type of the metal from which the workpiece is composed, etc,; it is essential that it be possible to achieve very small changes in the already very low basic flow rate of these lubricants, in order to achieve the minimum use of these lubricants which is consistent with superior tool life and operation. Finally, it is necessary that the metering apparatus for delivering such low flow rates be highly reliable, since if it fails to continuously deliver the precise amount of lubricant required, when needed, loss of the tool and possibly of the workpiece will occur shortly after the flow of lubricant is too low or is interrupted.

Accordingly, it is a primary object of the present invention to provide a highly reliable, precision, very low flow rate, lubricant metering apparatus for a tool and workpiece which has the further capability of having its flow rates selectively adjustable in minute amounts for the optimum minimum delivery of these special lubricants to the tool and workpiece.

In basic form, the present invention comprises a pneumatic air logic device which continuously generates a stream of output air pulses when supplied with compressed air. The air pulses are conveyed to a precision, positive displacement, pneumatic lubricant injector pump which delivers an output pulse of lubricant in response to each air input pulse. The output pulses of lubricant are then conveyed to the tool and workpiece and applied thereto in any suitable conventional fashion.

Since many machine tools incorporate a pneumatic chip blower and may use air to apply the lubricant to the tool and workpiece, a further object of the present invention is to conveniently supply both lubricant and compressed air to the tool and workpiece. To this end, special housings are provided which permit the lubricant delivery line from the lubricant injector pump to be located within the air delivery line to the tool and workpiece.

As will be appreciated, due to the high cost of the highly effective lubricants discussed above, it is important that the lubricant metering apparatus of the present invention not deliver lubricant to the tool and workpiece when the machine tool is not in use. On the other hand, it is equally important to insure that the lubricant metering apparatus of the present invention deliver lubricant to the tool and workpiece when the machine tool is in use, or loss of the tool and workpiece may result, as has been mentioned. Since many machine tools are powered by an air driven motor, one aspect of the present invention involves the use of an air flow sensing valve in the compressed air supply line to the machine tool's air motor which automatically supplies compressed air to activate the air logic unit, and thus the lubricant injector pump, only when the machine tool's air motor is consuming compressed air, i.e. when it is running.

It is to be understood that the foregoing is but a brief summary, and is not intended to be a detailed catalog of the objects, features, advantages, and characteristics of the present invention; for these and further objects, features, advantages and characteristics of the present invention will be apparent from the following more detailed description of the preferred embodiments thereof.

DESCRIPTION OF THE PREFERRED EMBODIMENTS

FIGS. 1-4 schematically illustrate four basic forms of the present invention in which, for clarity, the same components are given the same reference numeral. In the description which follows, the term "air" is used in its broadest sense to include not only atmospheric air, but any other gas or mixture of gases.

Figure 1:
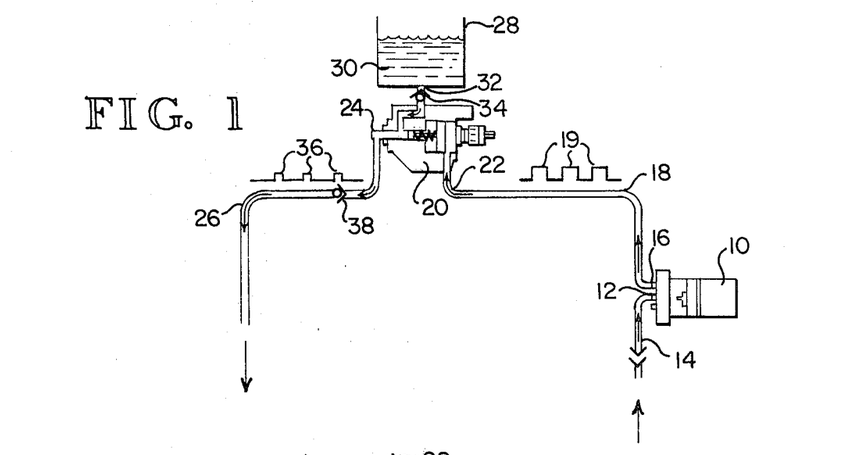
FIGS. 1-4 are schematic diagrams illustrating, respectively, four embodiments of the present invention.

Referring now to FIG. 1, the lubricant metering apparatus of the present invention includes a pneumatic air logic device 10 having an inlet 12 connected to a compressed air supply line 14, and an air pulse outlet 16 connected to an air pulse transfer line 18. When compressed air is delivered to the air logic device 10 through its supply line 14, the device 10 generates a stream of discreet air pulses 19 which are delivered to the air pulse transfer line 18 through its air pulse outlet 16. The air pulses 19 are diagrammatically illustrated by the wave forms shown in FIGS. 1-4.

A suitable air logic device 10 is made by the Crouzet Division Aerospatial, 62-64 Emile Zola Ave., Paris, France 75115 under part number 81 532 001 for the device 10's base and part number 81 506 820 for the main body of the device 10. This air logic device 10 is designed to operate with an input air pressure to its inlet 12 of 42 to 120 psi and will, in response to the air input, generate an air pulse stream from its outlet 16 which is selectively adjustable from 0 to 180 air pulses 19 per minute. However, it is preferred to operate it in the range of 50 to 120 air pulses 19 per minute, with a minimum air pulse frequency in the range of 50 to 90 pulses per minute in order to insure substantially continuous supplying of lubricant to the tool and workpiece by the injector pump 20, as will be discussed below. Because the device 10 will generate its output pulses with an input air pressure of 42-120 psi, the device is relatively immune to the changes in air pressure typically encountered in a manufacturing facility's installed compressed air system; thus enhancing the reliability of the lubricant metering apparatus of the present invention.

Referring again to FIG. 1, the pneumatically driven, positive displacement, precision lubricant injector pump 20 includes an air pulse inlet 22 connected to the air pulse transfer line 18, and a lubricant output pulse outlet 24 connected to a lubricant delivery line 26. A reservoir 28 of lubricant 30 supplies lubricant through line 32 to the pump 20 which includes a check valve 34 to prevent backflow of lubricant into the reservoir 28. The pump 20 delivers one lubricant output pulse 36 to the line 26 in response to each input air pulse 19, and a check valve 38 in the pump 20 prevents backflow of lubricant from the line 26 into the pump 20. The lubricant output pulses 36 are diagrammatically illustrated by the wave forms shown in FIGS. 1-4. Naturally, the lubricant delivery line 26 is for delivering the lubricant output pulses 36 to the tool and workpiece (not shown). Any conventional technique of applying the lubricant output pulses to the tool and workpiece can be used. By way of nonlimiting example, the end of the lubricant delivery line 26 can terminate in a tiny orifice which opens into the interior of a hollow air blast tube, where the lubricant is aspirated into the air stream in the air blast tube, and the resulting mixture is then directed onto the tool and workpiece.

Figure 7:
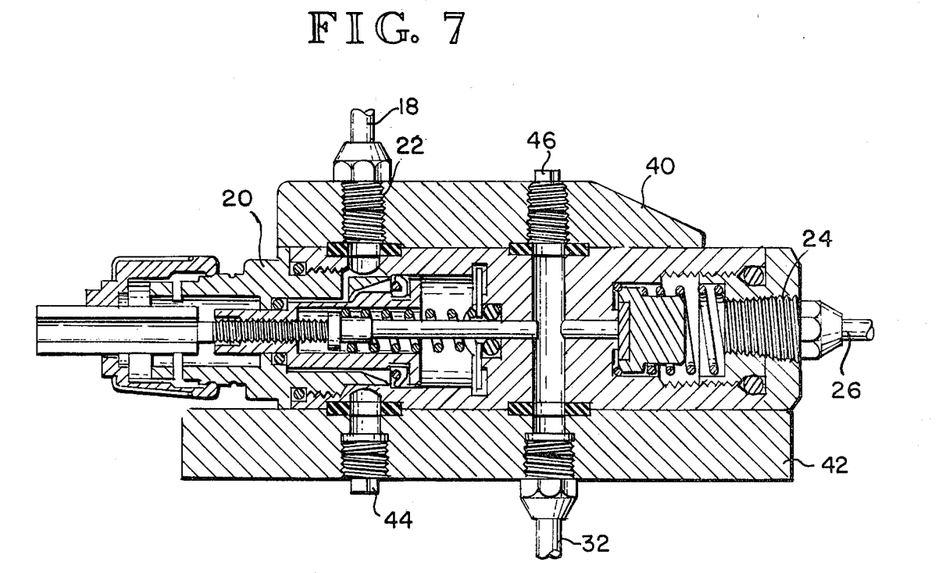
FIG. 7 is a cross sectional view of the lubricant injector pump used in the present invention.

A suitable lubricant pump 20 is illustrated in detail in FIG. 7 and is made by the Norgren Company of Littleton, Colo. under part number L30200M1X. The pump 20 includes a mounting block kit, made by the same company under part number 5705-50 having an upper mounting block 40 and a lower mounting block 42 secured to the pump body 20 by fasteners (not shown). The lower block 42 has two ports, one of which is sealed with a plug 44, and the other of which has connected to it the line 32 from the lubricant reservoir 28. The upper block 40 also has two ports, one of which is sealed with a plug 46, and the other of which has secured to it the air pulse transfer line 18.

The pump 20 is selectively adjustable so each of its lubricant output pulses 36 can range from about 1/1500th to 1/30th of a cubic centimeter in volume, and is adjustable in steps of about 1/1500th of a cubic centimeter for very fine control of the volume of each output pulse 36. Output pulses 36 are delivered from the pump 20 at a pressure of up to 10,000 pounds per square inch. Preferably, during typical machining operations, the volume of each lubricant output pulse 36 is in the range of about 0.0025 to 0.016 of a cubic centimeter. The preferred cumulative lubricant flow rates from the pump 20 for typical machining operations are from 0.33 to 0.8 cubic centimeters per minute.

Figure 2:
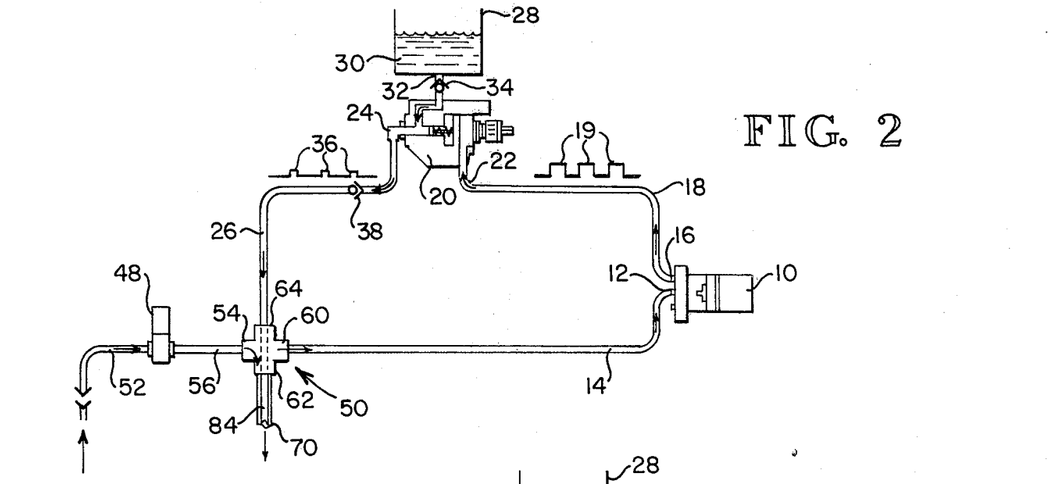

Turning now to FIG. 2, a second form of the present invention is shown which includes a compressed air supply line 52 which supplies compressed air to an on-off valve 48 which can be of any conventional construction and may be manually, pneumatically, electrically, etc. actuatable by the user. Compressed air from the valve 48 is supplied to a first port 54 of a housing 50 through line 56.

Figures 8, 9:
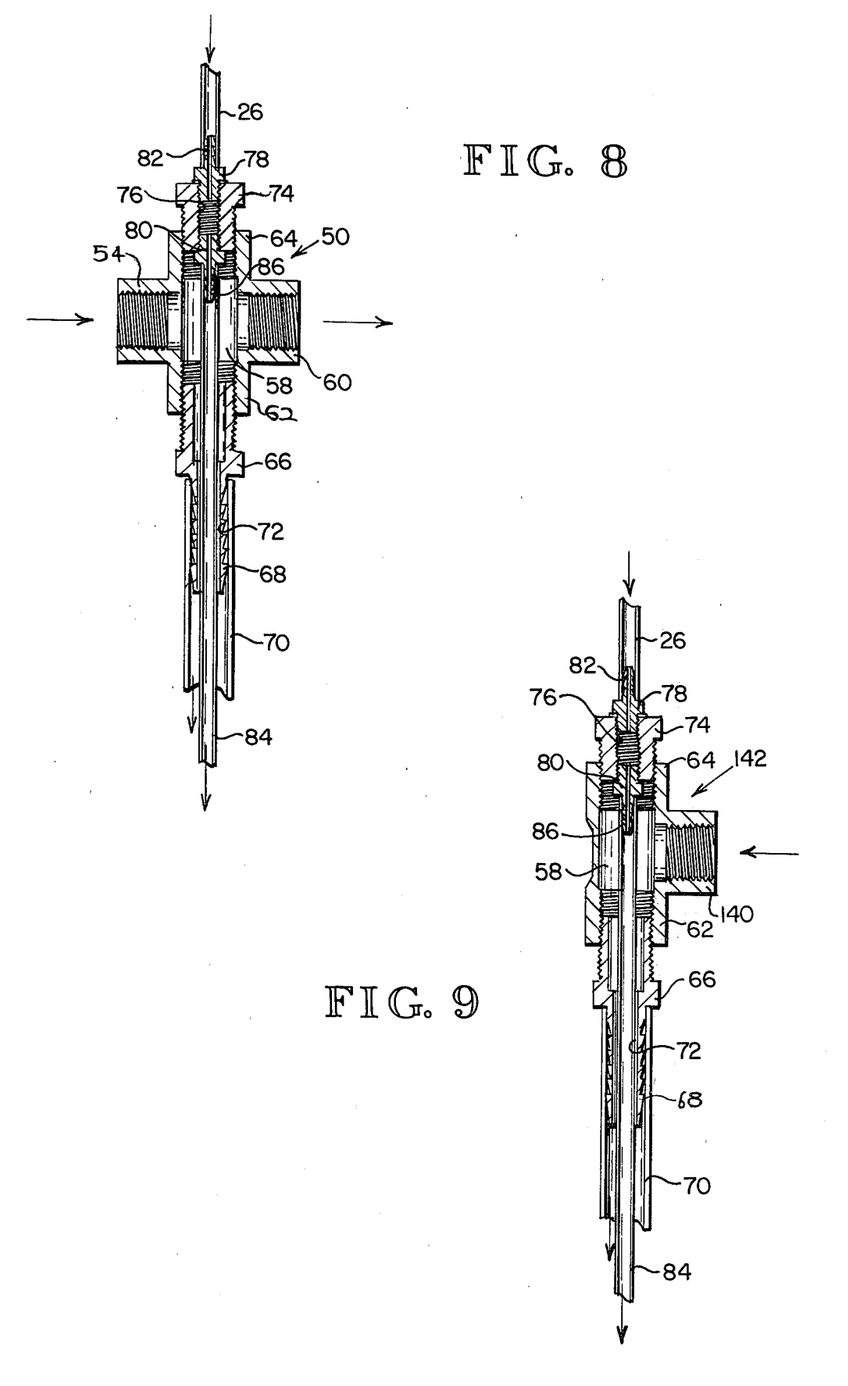
FIGS. 8 and 9 are, respectively, cross sectional views of two forms of a special housing used in the present invention to provide a lubricant delivery line inside an air delivery line.

Turning now to FIG. 8, the housing 50 is shown in detail and the line 56 (not shown) is connected to the port 54 by any conventional connector. The housing 54 defines an internal air chamber 58 which also has second, third, and fourth ports 60, 62, 64, respectively. The line 14 (not shown) to the air logic device 10 is connected to the second port 60 by any conventional connector. The third port 62 has screwed into it a fitting 66 having an elongated, serrated stem 68 over which an air delivery line 70 is secured in the conventional fashion. The fitting 66 defines a large bore 72 through which compressed air is supplied to the line 70 from the housing's internal air chamber 58.

The fourth port 64 has screwed into it a connector 74 defining a longitudinal bore 76. A lubricant inlet fitting 78 and a lubricant outlet fitting 80 are screwed into opposite ends of the connector 74. The construction of the fittings 78, 80 are the same as the fitting 66, except on a reduced scale. The lubricant delivery line 26 from the injector pump 20 is secured over the serrated stem 82 of the oil inlet fitting 78, and a lubricant delivery line 84 is secured over the serrated stem 86 of the oil outlet fitting 80. The lubricant delivery line conveys lubricant from the injector pump 20 to the tool and workpiece where the lubricant is supplied thereto by any conventional technique, such as was discussed above regarding the form of the invention shown in FIG. 1. As seen, the line 84 extends from the fitting 80, through the internal air chamber 56 of the housing 50, through the bore 72 of the fitting 66 and inside the compressed air delivery line 70. Naturally, the bore 72 and internal diameter of the line 70 are sized considerably larger than the lubricant delivery line 84 to prevent impeding of the flow of compressed air therethrough. Thus, it is seen that an extremely compact and tangle free arrangement is provided for the delivery of both lubricant and compressed air to the tool and workpiece.

As will be appreciated from the foregoing, the housing 50 not only provides such an arrangement, but also permits the division of the compressed air entering the housing 50 through port 54; part being delivered to the compressed air delivery line 70 through port 62, and part being supplied to the air logic device 10 through port 60 and line 14. Naturally, when the valve 48 is turned off, no compressed air is supplied to the compressed air lines 14, 70; and when no compressed air is supplied to the air logic device 10 through line 14, no lubricant is emitted from the injector pump 20.

Figure 3:
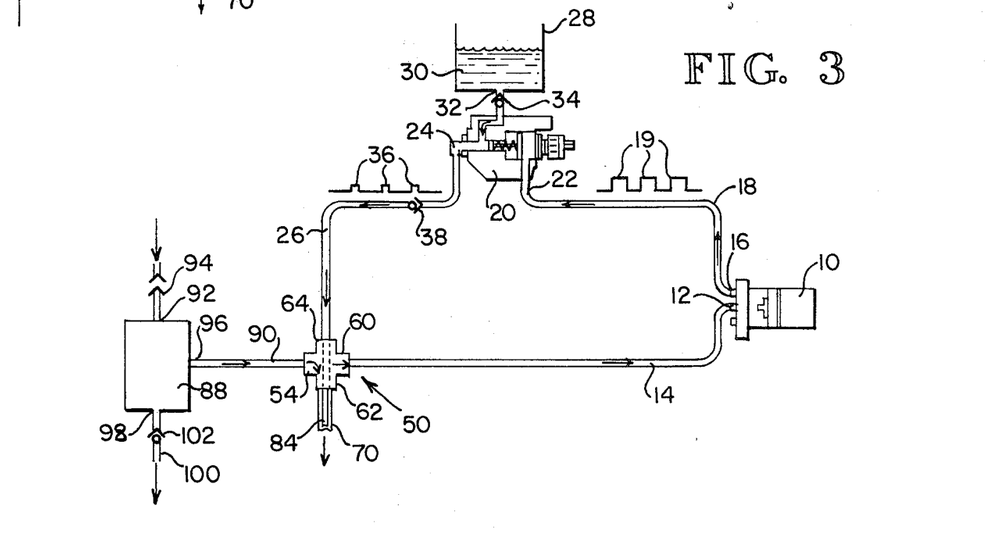

Turning now to FIG. 3, a third form of the lubricant metering apparatus of the present invention is illustrated, which is the same as that shown in FIG. 2, except compressed air is provided to port 54 of the housing 50 from an air flow sensing valve 88 through line 90. The valve 88 has an inlet 92 connected to a compressed air supply line 94, a first compressed air outlet 96 connected to the line 90, and a second compressed air outlet 98 which supplies compressed air to a compressed air delivery line 100, which in turn supplies compressed air to drive the air driven motor in the type of machine tool powered by the same (not shown). The valve 88 may include a check valve 102 to prevent any backflow of compressed air from the line 100. The air flow sensing valve 88 operates to provide compressed air to line 90 only when the air driven motor in the machine tool is consuming compressed air. This insures the automatic starting of delivery of lubricant from the injector pump 20 only when the machine tool is consuming compressed air to insure lubricant is provided when needed; and the automatic stopping of delivery of lubricant from the injector pump 20 when the machine tool is not consuming compressed air, to insure that the costly lubricant is not wasted when it is not needed.

Figure 5:
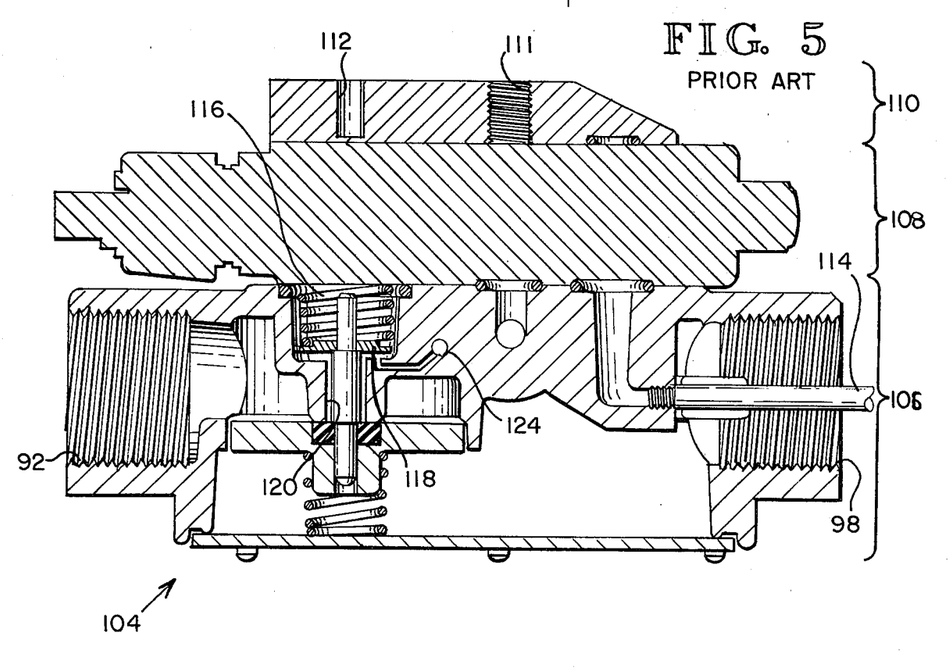
FIGS. 5 and 6 are, respectively, cross sectional views of a prior art device before and after modification for use in the present invention as an air flow sensing valve.

By way of non-limiting example, a suitable air flow sensing valve 88 may be provided by modifying the prior art air flow sensing valve 104 shown in FIG. 5 which is manufactured by the Norgren Company of Littleton, Colo. under part number L30-400S1X.

The prior art valve comprises three main parts, an air flow sensing valve proper 106, a lubricant injector 108, and a top mounting block 110, all of which are held in an assembled relation by fasteners (not shown).

Figure 6:
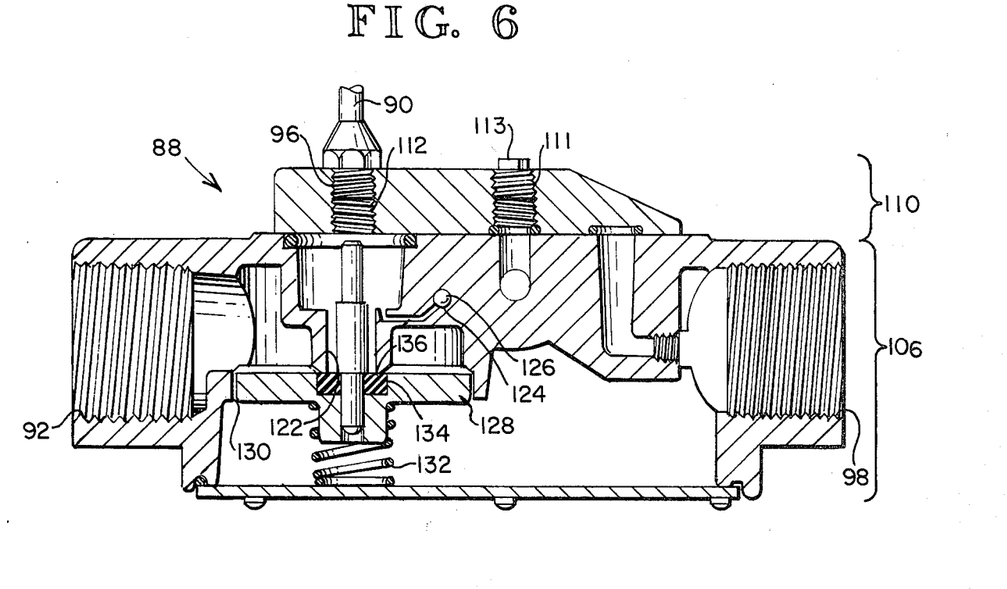

Referring now to FIGS. 5 and 6, in order to modify the prior art valve 104 for use in the present invention, said fasteners holding its three main parts in an assembled relation are removed, permitting their disassembly and the discarding of the injector 108. Next, the blind bore 112 in the block 108 is drilled through to provide outlet 96 to which the line 90 is connected, and the bore 111 in block 108 is sealed with plug 113. The line 114 in outlet 98 is removed and discarded. The valve spring 116 and valve seal 118 are also removed and discarded, after which the bore 120 is enlarged to 0.156 inches in diameter, to form a larger bore 122. The opening 124 is plugged with a piece of number 4 lead shot 126.

After these operations are completed, the block 110 is then assembled directly to the valve 106 with fasteners (not shown). In FIG. 6, the line 94 and 100 which are connected, respectively, to inlet 92 and outlet 98, are omitted for clarity. As has been mentioned, the valve 106 operates to provide compressed air to outlet 96, only when the air driven motor on the machine tool is consuming compressed air. This operation will now be explained. When the air driven motor is not consuming compressed air, air pressure equalizes on both sides of piston 128 through peripheral port 130; as a result of which spring 132 seats seal 134 against port 136 preventing escape of compressed air through outlet 96. On the other hand, when said air motor is consuming compressed air, air pressure below piston 128 is reduced, and the higher pressure above piston 128 forces it downwardly, unseating seal 134 and permitting compressed air to flow to outlet 96.

Although not illustrated, it will be apparent that the air flow sensing valve 88 could be used to supply compressed air to the embodiment of the invention shown in FIG. 1, by simply connecting the inlet of air line 14 to its outlet 96; the operation of the valve 88 then being the same as has been described.

Figure 4:
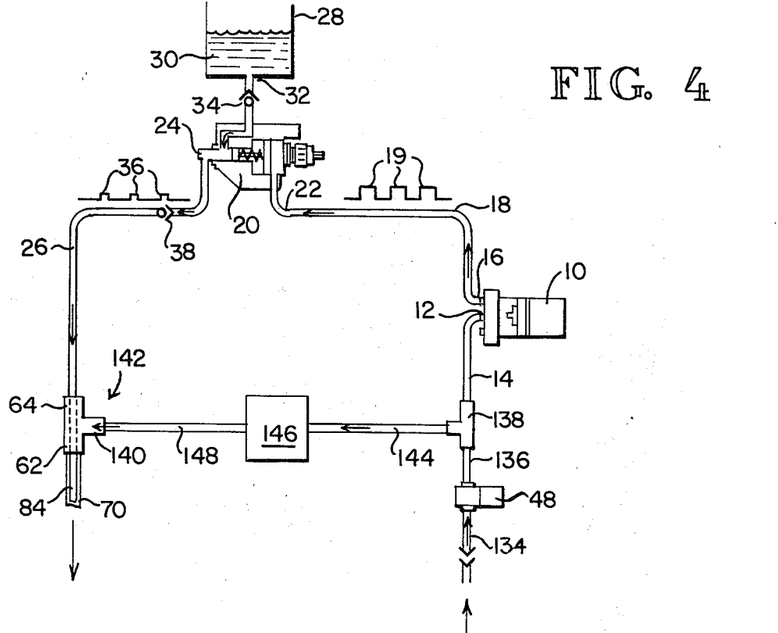

Turning now to FIG. 4, a fourth embodiment of the present invention is illustrated in which compressed air from a supply line 134 is supplied to line 14 through on-off valve 48, line 136, and T-fitting 138. Compressed air from the T-fitting 138 is supplied to the inlet port 140 of housing 142 through line 144, air flow regulating means 146 and line 148. The air flow regulating means 146 is for controlling the volume of compressed air supplied to port 140 of housing 142 through line 148, and may be of any conventional construction.

The housing 142 is shown in detail in FIG. 9. Its construction and operation is identical to the housing 50 shown in FIG. 8, except that the outlet 60 has been eliminated, and inlet 140 serves the purpose of inlet 54. Again, the compressed air supply line 148 to inlet 140 is not shown for purposes of clarity. In FIGS. 8 and 9 like parts are given the same reference numeral. In the embodiment of the present invention shown in FIG. 4, lubricant delivered to the tool and workpiece through lubricant delivery line 84 may be applied thereto in the same fashion as was discussed with regard to the form of the invention shown in FIG. 1.

Although not illustrated, it will be apparent that the air flow sensing valve 88 could be used to supply compressed air to the embodiment of the invention shown in FIG. 4, by simply connecting the inlet of the air line 134 to its outlet 96, or by bypassing the air flow regulating means 146 and valve 48, and connecting the inlets of the lines 14 and 148 to the valve 88's outlet 96 using a T-fitting; the operation of the valve 88 then being the same as has been described.

In all the forms of the present invention which are discussed above, when the lubricant is normally solid at room temperatures, such as the cetyl alcohol and Spermaceti lubricants mentioned earlier, naturally such lubricants will have to be warmed to above their melting points. This can be done in any convenient fashion, such as by wrapping all the items containing, conveying, pumping and dispensing these lubricants with electric resistant heating tapes of conventional construction and suitably insulating said items. Naturally, many other equally effective means for carrying out the end of keeping such lubricants above their melting point will occur to those skilled in the art.

Turning now to the method of the present invention, it should be clear from the foregoing that the method comprises the step of applying, in liquid form, very low flow rates of these special lubricants discussed herein as being suitable, to the workpiece and tool substantially continuously during machining operations, thereby eliminating the need for high lubricant flow rates and special cooling techniques such as the application of fluorocarbons to the tool and/or workpiece. Preferably, the very low flow rate of these special lubricants is less than about 0.8 cubic centimeters per minute; and is preferably in the range of about 0.33 to 0.8 cubic centimeters per minute. Preferably, said flow rate is produced by stream of lubricant pulses having a minimum frequency of about 50 to 90 pulses per minute, wherein the volume of each said lubricant pulse is selectively adjustable in stages of about 1/1500th of a cubic centimeter.

By way of non-limiting example, while a ½ inch deep hole was being drilled in 2024-T351 aluminum with a 5/16th inch drill operating at 3000 rpm at a 0.006 inches per minute feed rate to produce said hole in 1.67 seconds, satisfactory results were obtained with a flow of Boelube lubricant at the rate of about 0.33 cubic centimeters per minute, applied at the rate of 60 pulses of Boelube lubricant per minute, each having a volume of 0.0055 cubic centimeters.

I claim:

1. A precision, very low flow rate, lubricant metering apparatus for a tool and workpiece comprising:
    a pneumatic air logic means for generating, during operation, a substantially continuous stream of air pulses, said air logic means having an inlet adapted to be connected to a source of compressed air, and an air pulse outlet;
    a pneumatically driven, positive displacement, precision lubricant injector pump for delivering, during operation, a substantially continuous stream of lubricant output pulses in response to said stream of said air pulses which is delivered to it, wherein said injector pump includes an air pulse inlet, a lubricant inlet adapted to be connected to a source of supply of lubricant, and a lubricant output pulse outlet adapted to be connected to a line for delivery of said lubricant output pulses to said tool and workpiece;
    a line connected between said air pulse outlet of the air logic means and said air pulse inlet of the injector pump for delivering said stream of air pulses from said air logic means to said injector pump; and
    a housing defining an internal air chamber having first, second, third, and fourth port means, wherein:
    said first port means is adapted to be connected to a source of compressed air;
    said second port means includes a line connected to the inlet of said air logic means for delivering pressurized air thereto;
    said third port means includes an air delivery line adapted to deliver compressed air to said tool and workpiece; and
    said fourth port means includes a connector defining a longitudinal bore; a lubricant inlet fitting in communication with one end of said bore; a lubricant outlet fitting in communication with the other end of said bore; a lubricant transfer line connected between said lubricant output pulse outlet of the injector pump and said lubricant inlet fitting of said fourth port means; and a lubricant delivery line connected to said lubricant outlet fitting of said fourth port means for delivering said lubricant output pulses to said tool and workpiece; wherein said lubricant delivery line is sized smaller than the internal diameter of said air delivery line and extends from said lubricant outlet fitting of said fourth port means, through said internal air chamber, and into the inside of said air delivery line for a substantial distance.

2. The lubricant metering apparatus according to claim 1, further comprising a line connected to said first port means for delivering compressed air thereto, and a valve means for controlling the flow of compressed air through said line which is connected to said first port means.

3. The lubricant metering apparatus according to claim 1, wherein said apparatus is adapted to be used with a tool having an air driven motor; wherein said apparatus further comprises an airflow sensing valve means having an inlet adapted to be connected to a source of compressed air, a first air delivery outlet means adapted to be connected to means for delivering compressed air to said air driven motor, and a second air delivery outlet means including a line for delivering compressed air to said first port means of said housing; wherein said air flow sensing valve means is for automatically delivering compressed air to said second air delivery outlet means when said air driven motor is consuming compressed air, and is for automatically cutting off compressed air to said second air delivery outlet means when said air driven motor is not consuming compressed air.

4. A precision, very low flow rate, lubricant metering apparatus for a tool and workpiece comprising:
    a pneumatic air logic means for generating, during operation, a substantially continuous stream of air pulses, said air logic means having an inlet adapted to be connected to a source of compressed air, and an air pulse outlet;

a pneumatically driven, positive displacement, precision lubricant injector pump for delivering, during operation, a substantially continuous stream of lubricant output pulses in response to said stream of said air pulses which is delivered to it, wherein said injector pump includes an air pulse inlet, a lubricant inlet adapted to be connected to a source of supply of lubricant, and a lubricant output pulse outlet adapted to be connected to a line for delivery of said lubricant output pulses to said tool and workpiece;

a line connected between said air pulse outlet of the air logic means and said air pulse inlet of the injector pump for delivering said stream of air pulses from said air logic means to said injector pump;

wherein said apparatus is adapted to be used with a tool having an air driven motor; and wherein said apparatus further comprises an air flow sensing valve means having an inlet adapted to be connected to a source of compressed air, a first air delivery outlet adapted to be connected to means for delivering compressed air to said air driven motor, and a second air delivery outlet means including a line for delivering compressed air to said inlet of the air logic means; wherein said air flow sensing valve means is for automatically delivering compressed air to said second air delivery outlet means when said air driven motor is consuming compressed air, and is for automatically cutting off compressed air to said second air delivery outlet means when said air driven motor is not consuming compressed air.

5. A precision, very low flow rate, lubricant metering apparatus for a tool and workpiece comprising:

a pneumatic air logic means for generating, during operation, a substantially continuous stream of air pulses, said air logic means having an inlet adapted to be connected to a source of compressed air, and an air pulse outlet;

a pneumatically driven, positive displacement, precision lubricant injector pump for delivering, during operation, a substantially continuous stream of lubricant output pulses in response to said stream of said air pulses which is delivered to it, wherein said injector pump includes an air pump inlet, a lubricant inlet adapted to be connected to a source of supply of lubricant, and a lubricant output pulse outlet adapted to be connected to a line for delivery of said lubricant output pulses to said tool and workpiece;

a line connected between said air pulse outlet of the air logic means and said air pulse inlet of the injector pump for delivering said stream of air pulses from said air logic means to said injector pump; and a housing defining an internal air chamber having first, second, and third port means, wherein:

said first port means is adapted to be connected to means for delivering compressed air thereto;

said second port means includes an air delivery line adapted to deliver compressed air to said tool and workpiece;

said third port means includes a connector defining a longitudinal bore; a lubricant inlet fitting in communication with one end of said bore; a lubricant outlet fitting in communication with the other end of said bore; a lubricant transfer line connected between said lubricant output pulse outlet of the injector pump and said lubricant inlet fitting of said third port means; and a lubricant delivery line connected to said lubricant outlet fitting of said third port means for delivering said lubricant output pulses where needed; wherein said lubricant delivery line is sized smaller than the internal diameter of said air delivery line and extends from said lubricant outlet fitting of said third port means, through said internal air chamber, and into the inside of said air delivery line for a substantial distance.

6. The lubricant metering apparatus according to claim 5, further comprising:

a compressed air supply line having one end adapted to be connected to a source of compressed air;

an air flow regulating means having an inlet and an outlet;

means for delivering compressed air from said air supply line to said inlets of said air logic means and said air flow regulating means; and an air line connected between said outlet of said air flow regulating means and said first port of the housing.

7. The lubricant metering apparatus according to claim 6, wherein said lubricating apparatus further comprises a valve means for controlling the flow of compressed air through said compressed air supply line.

8. The lubricating metering apparatus according to claim 5, wherein said apparatus is adapted to be used with a tool having an air driven motor, wherein said lubricating apparatus further comprises an air flow sensing valve means having an inlet adapted to be connected to a source of compressed air, a first air delivery outlet means adapted to be connected to means for delivering compressed air to said air driven motor, and a second air delivery outlet means for delivering compressed air to said inlets of the air logic means and said first port of said housing; and wherein said air flow sensing valve means is for automatically delivering compressed air to said second air delivery outlet means when said air driven motor is consuming compressed air, and is for automatically cutting off compressed air to said second air delivery outlet means when said air driven motor is not consuming compressed air.

9. The apparatus according to claims 1, 2, 3, 4, 5, 6, 7, or 8, wherein said flow rate is less than about 10 cubic centimeters per minute.

10. The apparatus according to claim 9, wherein said lubricant comprises a high carbon, long carbon chain, fatty alcohol lubricant.

11. The apparatus according to claim 10, wherein said flow rate is less than about 0.8 cubic centimeters per minute.

12. The apparatus according to claim 9, wherein said lubricant comprises Boelube brand lubricant.

13. The apparatus according to claim 12, wherein said flow rate is less than about 0.8 cubic centimeters per minute.

14. A precision, very low flow rate lubricant metering apparatus for lubricating a tool and workpiece during machining operations, comprising means for substantially continuously, during operation, delivering lubricant to an output, for delivery to a tool and workpiece during machining operations, at a very low flow rate of less than about 10 cubic centimeters per minute, wherein the lubricant is of the type which permits said machining operations to take place at said very low flow rate without substantially reducing the cutting action between the tool and workpiece, and without substantially reducing the life of the tool; thereby eliminating the need for special cooling techniques such as the use of liquid fluorocarbon coolants and the use of high lubricant flow rates for cooling purposes.

15. The apparatus according to claim 14, wherein said flow rate is less than about 0.8 cubic centimeters per minute.

16. The apparatus according to claims 14 or 15, wherein said lubricant comprises a high carbon, long carbon chain, fatty alcohol lubricant.

17. The apparatus according to claim 16, wherein said lubricant comprises Boelube brand lubricant.

18. The apparatus according to claims 14 or 15, wherein said means for substantially continuously delivering lubricant comprise:
   a pneumatic air logic means for generating, during operation, a substantially continuous stream of air pulses, said air logic means having an inlet adapted to be connected to a source of compressed air, and an air pulse outlet;
   a pneumatically driven, positive displacement, precision lubricant injector pump for delivering, during operation, a substantially continuous stream of lubricant output pulses in response to said stream of said air pulses which is delivered to it, wherein said injector pump includes an air pulse inlet, a lubricant inlet adapted to be connected to a source of supply of lubricant, and a lubricant output pulse outlet adapted to be connected to a line for delivery of said lubricant output pulses to said tool and workpiece; and
   a line connected between said air pulse outlet of the air logic means and said air pulse inlet of the injector pump for delivering said stream of air pulses from said air logic means to said injector pump.

19. The apparatus according to claim 18, wherein the minimum frequency of said air pulses and of said lubricant output pulses is generally about the range of 50 to 90 pulses per minute, and wherein the amount of lubricant delivered in each said lubricant output pulse is selectively adjustable in the range of about 0.0025 to 0.016 of a cubic centimeter.

20. The apparatus according to claim 18, wherein said lubricant comprises a high carbon, long carbon chain, fatty alcohol lubricant.

* * * * *